United States Patent
Liu et al.

(10) Patent No.: US 12,527,830 B2
(45) Date of Patent: Jan. 20, 2026

(54) METHOD FOR TREATING AND PREVENTING ULCERATIVE COLITIS AND METHOD FOR DAI REDUCTION

(71) Applicants: BEIJING WEHAND-BIO PHARMACEUTICAL CO., LTD, Beijing (CN); GUANGXI WEHAND-BIO PHARMACEUTICAL CO., LTD, Guangxi (CN)

(72) Inventors: Yuling Liu, Beijing (CN); Jun Ye, Beijing (CN); Dongdong Liu, Beijing (CN); Hongliang Wang, Beijing (CN); Mo Wang, Beijing (CN); Renjie Li, Beijing (CN); Yanfang Yang, Beijing (CN)

(73) Assignees: BEIJING WEHAND-BIO PHARMACEUTICAL CO., LTD, Beijing (CN); GUANGXI WEHAND-BIO PHARMACEUTICAL CO., LTD, Guangxi (CN)

( * ) Notice: Subject to any disclaimer, the term of this patent is extended or adjusted under 35 U.S.C. 154(b) by 0 days.

(21) Appl. No.: 18/902,831

(22) Filed: Sep. 30, 2024

(65) Prior Publication Data
US 2025/0018000 A1   Jan. 16, 2025

Related U.S. Application Data

(63) Continuation-in-part of application No. PCT/CN2023/093572, filed on May 11, 2023.

(30) Foreign Application Priority Data

Apr. 1, 2022 (CN) .......................... 202210338779.2

(51) Int. Cl.
A61K 36/605 (2006.01)
A61P 1/04 (2006.01)

(52) U.S. Cl.
CPC .............. *A61K 36/605* (2013.01); *A61P 1/04* (2018.01); *A61K 2236/30* (2013.01); *A61K 2236/51* (2013.01)

(58) Field of Classification Search
None
See application file for complete search history.

(56) References Cited

FOREIGN PATENT DOCUMENTS

| | | |
|---|---|---|
| CN | 104857329 | 8/2015 |
| CN | 110393738 | 11/2019 |
| CN | 111077247 | 4/2020 |
| CN | 113143996 | 7/2021 |
| CN | 113143997 | 7/2021 |
| CN | 114601865 | 6/2022 |
| KR | 20180042729 | 4/2018 |
| KR | 20190125020 | 11/2019 |

OTHER PUBLICATIONS

Wang et al. (2019) Bioscience, Biotechnology and Biochemistry, vol. 83, No. 5: 914-922. (Year: 2019).*
Mo et al. (2022) Antioxidants 11: 1674 (17 pages). (Year: 2022).*
Cui et al. (2024) J. Nutr. Health 87(6): 567-579. (Year: 2024).*
Cui et al. (2019) J. Nutr. Health 52(2): 139-148 (Year: 2019).*
Raskin et al. (2004) Current Pharmaceutical Design 10: 3419-3429. (Year: 2004).*
Revilla et al. (1998) J. Agric. Food Chem. 46: 4592-4597. (Year: 1998).*
Inflammatory Bowel Disease Group, Chinese Society of Gastroenterology, Chinese Medical Association, "Consensus on Diagnosis and Management of Inflammatory Bowel Disease", Chinese Journal of Digestion, vol. 38, No. 5, May 2018, pp. 292-311, with English abstract thereof.
Shun-Hua Zheng et al., "Experimental Study on Ulcerative Colitis Treated by "Lung-intestine Nourishing Decoction"", Shanghai Journal of Traditional Chinese Medicine, No. 6, Jun. 15, 2020, with English abstract thereof, pp. 1-4.
"International Search Report (Form PCT/ISA/210) of PCT/CN2023/093572," mailed on Aug. 11, 2023, with English translation thereof, pp. 1-7.

* cited by examiner

*Primary Examiner* — Russell G Fiebig
(74) *Attorney, Agent, or Firm* — JCIPRNET

(57) ABSTRACT

The invention discloses a use of a mulberry (*Morus alba* L.) extract, including a method for treating ulcerative colitis, a method for preventing ulcerative colitis, and a method for reduction in Disease Activity Index, DAI. The use is application of a mulberry extract to the preparation of a product for treating and/or preventing ulcerative colitis. The invention experimentally demonstrated that positive drug group, SZ-A-1, SZ-A-2, SZ-A-3, SZ-A-4 and SZ-A-5 (pretreatment) could each significantly inhibit colonic atrophy in UC model mice, and the effects in SZ-A-2, SZ-A-3 and SZ-A-4 groups are comparable to that in positive drug group, with SZ-A-5 (pretreatment) achieving a superior effect to the positive drug. The mulberry extract of the invention, as a component derived from natural plants, has unique advantages of small toxic and side effects, mild and lasting actions etc.

9 Claims, 6 Drawing Sheets

METHOD FOR TREATING AND PREVENTING ULCERATIVE COLITIS AND METHOD FOR DAI REDUCTION

CROSS-REFERENCE TO RELATED APPLICATION

This is a continuation-in-part application of International Application No. PCT/CN2023/093572, filed on May 11, 2023, which claims the priority benefits of China Application No. 202210338779.2, filed on Apr. 1, 2022. The entirety of each of the above-mentioned patent applications is hereby incorporated by reference herein and made a part of this specification.

BACKGROUND

Technical Field

The invention is in the field of medicine, and particularly relates to use of a mulberry (*Morus alba* L.) extract in the preparation of a medicament for treating ulcerative colitis.

Description of Related Art

Inflammatory bowel disease (IBD) refers to an autoimmune disease involving inflammatory lesions in colon due to various reasons, mainly including Crohn's disease (CD) and ulcerative colitis (UC). In recent 20 years, the number of confirmed cases in China has increased rapidly. To date, its pathogenesis has not been understood completely, and there are numerous influencing factors such as environment, immune responses, genetics, microorganisms, etc. Inflammatory bowel disease (IBD) is different from normal intestinal inflammation (as in CN113143996 A). Drugs or active ingredients with anti-inflammatory activity tend to be used to treat intestinal inflammation, but would not work well with inflammatory bowel disease (IBD). Despite great advance in the treatment of inflammatory bowel disease, it remains to be an incurable disease with no efficacious drugs available across the world.

Chronic, low-grade inflammation developed in the whole intestine in the mice with diabetes after high-fat feeding as disclosed in CN113143996A, with inflammation caused by ulcerative colitis limited to the large intestine alone (Inflammatory Bowel Disease Group, Chinese Society of Gastroenterology, Chinese Medical Association. Consensus on Diagnosis and Management of Inflammatory Bowel Disease (Beijing, 2018) [J]. Chinese Journal of Digestion, 2018, 38(5): 292-311. DOI: 10.3760/cma.j.issn. 0254-1432.2018.05.002). Ulcerative colitis differs from chronic, low-grade inflammation in further development of the symptoms as follows: 1. bloody stool and perianal abscess; 2. systematic symptoms, such as weight loss, fever, fatigue, anemia etc.; 3. parenteral manifestations, such as joint, skin, mucosa and eye lesions etc.; intestinal perforation, intestinal obstruction, massive bleeding etc., and even cancer in severer cases. In addition, ulcerative colitis has a prolonged, delayed course and recurrent attacks, remaining incurable at present.

Clinically, aminosalicylic acid preparations are mainly used for the treatment of mild UC. Glucocorticoids can be used for the treatment of those whose symptoms are not well controlled after being treated with an adequate amount of aminosalicylic acid preparations (usually 2-4 weeks), especially for those with extensive lesions. Immunosuppressant such as thiopurine drugs is used for the treatment of those on whom hormones fail, or who depend on hormones. If these symptoms remain yet to be relieved by the therapeutic approaches above, an anti-TNFα inhibitor is administered to the patients.

Moreover, current drugs for IBD are accompanied by serious side effects, including loss of immune tolerance and drug resistance, infection complications, endocrine damages, kidney and liver damages. At present, therapeutic protocols for IBD are low in efficacy and have a rising level of adverse reactions—the main concerns in clinical treatment.

Therefore, developing a safe and effective drug for treating IBD has become an urgent and significant scientific issue.

SUMMARY

The objective of the invention is to provide a new use of a mulberry extract or a main active ingredient thereof as a medicament.

The new use of a mulberry extract or a main active ingredient thereof as provided by the invention is any of (a1)-(a4) as follows:
  (a1) use of a mulberry extract in the preparation of a product for treating ulcerative colitis;
  (a2) use of a mulberry extract in the preparation of a product for preventing ulcerative colitis;
  (a3) use of a mulberry extract in the treatment of ulcerative colitis; and
  (a4) use of a mulberry extract in the prevention of ulcerative colitis.

The prevention and/or treatment of ulcerative colitis is/are reflected in at least one of:
  1) inhibition of colonic atrophy in patients with ulcerative colitis;
  2) inhibition of weight loss in patients with ulcerative colitis;
  3) reduction in Disease Activity Index, DAI, for patients with ulcerative colitis; and
  4) improvement in colonic structure, gland arrangement, and inflammatory cell infiltration in patients with ulcerative colitis.

The invention further protects use of a mulberry extract or a main active ingredient thereof, which is at least one of (b1)-(b8) as follows:
  (b1) preparation of a product for inhibiting colonic atrophy in patients with ulcerative colitis;
  (b2) preparation of a product for inhibiting weight loss in patients with ulcerative colitis;
  (b3) preparation of a product for reducing Disease Activity Index, DAI, for patients with ulcerative colitis;
  (b4) preparation of a product for improving colonic structure, gland arrangement, and inflammatory cell infiltration in patients with ulcerative colitis;
  (b5) inhibition of colonic atrophy in patients with ulcerative colitis;
  (b6) inhibition of weight loss in patients with ulcerative colitis;
  (b7) reduction in Disease Activity Index, DAI, for patients with ulcerative colitis; and
  (b8) improvement in colonic structure, gland arrangement, and inflammatory cell infiltration in patients with ulcerative colitis.

The product is a medicament or a pharmaceutical formulation.

The mulberry extract is a *Ramulus mori* extract, a Cortex Mori extract and/or a Folium Mori extract. Alternatively, the mulberry extract can also be provided in the form of commercially available *Ramulus Mori* total alkaloid Tablet (NMPN Z20200002).

The mulberry extract can be prepared with reference to the method described in CN113143997A, and the detailed method for preparation comprises the steps of:
1) preparing a crude extract from a plant of *Moraceae*;
2) separating the crude extract via a cation resin and/or optionally, an anion resin, to provide a mulberry extract.

The method can further comprise the steps of:
3) subjecting the effluent from the resin in step 2) to alcohol precipitation and collecting a supernatant; and
4) concentrating and drying the supernatant.

The method can further comprises the step of: concentrating and drying the effluent from the resin in step 2).

The mulberry extract acts on humans or mammals.

The plant of *Moraceae* can be selected from *Morus atropurpurea* Roxb., *Morus multicaulis* Perr., *Morus alba* (also known as White Mulberry), *Morus serrata* Roxb., *Morus mongolica* Schneid or Hybrid Mulberry, and the Hybrid Mulberry is preferably Yuesang No. 11, Guisangyou No. 62 or Sangteyou No. 2. Leaves, roots, twigs, barks, buds, stems, and fruits, among other parts, of the plant can be used.

In one embodiment of the invention, the mulberry extract mainly comprises alkaloids, and further polysaccharides, flavonoids, and amino acids.

Preferably, the alkaloids comprise at least one of 1-deoxynojirimycin or DNJ, N-methly-1-deoxynojirimycin, fagomine or FAG, 3-epi-fagomine, 1,4-dideoxy-1,4-imino-D-arabinitol or DAB, calystegin B2, calystegin C1, 2-O-(α-D-galactopyranosyl)-1-deoxynojirimycin, 6-O-(β-D-glucopyranosyl)-1-deoxynojirimycin, and 1,4-dideoxy-1,4-imino-(2-O-β-D-glucopyranosyl)-D-arabinitol.

Of these, the weight percentage of DNJ is not less than 50% of total alkaloids.

Based on the mulberry extract, each component has content by weight of:
alkaloids 50-65%,
polysaccharides 20-25%,
flavonoids 0.5-1.5%,
amino acids 3-20%,
other components 8-20%.

Preferably, in the mulberry extract, each component has content by weight of:
alkaloids 50-65%,
polysaccharides 20-25%,
flavonoids 0.5-1.5%,
amino acids 5-20%,
other components 8-20%.

Preferably, in the mulberry extract, each component has content by weight of:
alkaloids 3-98%,
polysaccharides 0.2-70%,
flavonoids 0.05-10%,
amino acids 0-45%,
the balance are other components.

Preferably, in the mulberry extract, each component has content by weight of:
alkaloids 15-98%,
polysaccharides 0.2-35%,
flavonoids 0.05-7%,
amino acids 0-45%,
the balance are other components.

Preferably, in the mulberry extract, each component has content by weight of:
alkaloids 30-98%,
polysaccharides 0.2-35%,
flavonoids 0.05-2%,
amino acids 0-25%,
the balance are other components.

Preferably, in the mulberry extract, each component has content by weight of:
Alkaloids 40-98%,
Polysaccharides 0.2-25%,
Flavonoids 0.05-1%,
Amino acids 0-25%,
the balance are other components.

Preferably, in the mulberry extract, each component has content by weight of:
Alkaloids 50-98%,
Polysaccharides 0.2-25%,
Flavonoids 0.05-1%,
Amino acids 0-20%,
the balance are other components.

Preferably, in the mulberry extract, each component has content by weight of:
Alkaloids 15-80%,
Polysaccharides 5-35%,
Flavonoids 0.1-7%,
Amino acids 3-45%,
the balance are other components.

In one embodiment, the preparation of the mulberry extract comprises the steps of: preparing a crude extract; optionally, separating via a cation resin and/or an anion resin; optionally, subjecting the effluent from the resin to alcohol precipitation; and optionally, concentrating and drying. Preferably, the preparation of the mulberry extract comprises the steps of: step 1) preparing a crude extract; step 2) separating via a cation resin and/or optionally, an anion resin; optionally, step 3) subjecting the effluent from the resin in step 2) to alcohol precipitation; and optionally, step 4) concentrating and drying.

In one embodiment, the mulberry extract is prepared according to the steps of: crushing mulberry twigs (*Ramulus Mori*), mulberry leaves (Folium Mori) or mulberry root-barks (Cortex Mori), for extraction with water and/or alcoholic solution or acid water under heat reflux, with an amount of the solvent(s) 3-20 times the raw medicinal materials, repeating the extraction for 1-3 times, combing the extraction liquids, concentrating, going through a cation exchange resin, optionally washing away with water (preferably distilled water) the impurities that are not adsorbed, eluting with 0.2-3N aqueous ammonia, concentrating and subjecting the eluent to an anion exchange resin, collecting the portions that are not adsorbed, adding ethanol, removing impurities by precipitation, centrifuging, and subjecting the supernatant to concentration (preferably concentration under reduced pressure) or drying (preferably, spray-drying or freeze-drying) to provide the extract.

In one embodiment, the mulberry extract is prepared according to the steps of: crushing mulberry twigs, mulberry leaves or mulberry root-barks for extraction with water and/or alcoholic solution or acid water under heat reflux, with an amount of the solvent(s) 3-20 times the raw medicinal materials, repeating the extraction for 1-3 times, combing the extraction liquids, concentrating, going through a cation exchange resin, optionally washing away with water (preferably distilled water) the impurities that are not adsorbed, eluting with 0.2-3N aqueous ammonia, concentrating and subjecting the eluent to an anion exchange resin, collecting the portions that are not adsorbed, and concentrating (preferably under reduced pressure) or drying (preferably spray-drying or freeze-drying) to provide the extract.

In one embodiment, the mulberry extract is prepared according to the steps of: crushing mulberry twigs, mulberry leaves or mulberry root-barks for extraction with water and/or alcoholic solution or acid water under heat reflux, with an amount of the solvent(s) 3-20 times the raw medicinal materials, repeating the extraction for 1-3 times, combing the extraction liquids, concentrating, going through a cation exchange resin, optionally washing away with water (preferably distilled water) the impurities that are not adsorbed, eluting with 0.2-3N aqueous ammonia, and subjecting the eluent to concentrating (preferably under reduced pressure) or drying (preferably spray-drying or freeze-drying) to provide the extract.

In one embodiment, the mulberry extract is prepared according to the steps of: crushing mulberry twigs, mulberry leaves or mulberry root-barks for extraction with water under heat reflux, with an amount of the solvent(s) 3-20 times (preferably 4-15 times, and more preferably 4-12 times) the raw medicinal materials, repeating the extraction for 1-3 times (extraction for preferably 0.5-3 h each time, and more preferably 1-2 h each time), combing the extraction liquids, concentrating, going through a cation exchange resin, optionally washing away with water (preferably distilled water) the impurities that are not adsorbed, eluting with 0.2-3N aqueous ammonia, subjecting the eluent to an anion exchange resin, collecting the portions that are not adsorbed (i.e., the effluent from the anion resin), adding ethanol, removing impurities by precipitation, centrifuging, and subjecting the supernatant to concentrating (preferably under reduced pressure) or drying (preferably spray-drying or freeze-drying) to provide the extract.

Preferably, the column is subjected to activation by washing with acidic solution, washing with alkaline solution, and washing with acidic solution in sequence after it is packed with a cation resin. Preferably, washing with alkaline solution is continued until the pH of the effluent is 8.0-9.5, preferably 8.5-9.5; preferably, the alkaline solution is selected from aqueous ammonia solution, sodium hydroxide solution, potassium hydroxide solution or sodium carbonate solution; preferably, the concentration of the alkaline solution is 0.5-4 mol/L. Preferably, washing with acidic solution is continued until the pH of the effluent is 3.0-7.0, preferably 4.5-6.5. Preferably, the acidic solution is selected from hydrochloric acid solution (the concentration can be 1.5-2 mol/L), phosphoric acid solution, and sodium phosphate dibasic-citric acid buffer. Optionally, the cation resin can further be subject to rinsing with 3-5 column volumes of deionized water following the last washing with acidic solution.

Preferably, the cation resin is 732-type strongly acidic styrene based cation exchange resin, 734-type strongly acidic styrene based cation exchange resin, D001-type macroporous strongly acidic styrene based cation exchange resin or D113-type macroporous weakly acidic cation exchange resin.

Preferably, the ratio of the amount of the cation resin used to the weight of the feed of the plant as raw materials is 1:2-20 (more preferably, the ratio of the amount of the cation resin used to the weight of the feed of the plant as raw materials is 1:2-7). After the crude extract from the plant is loaded onto a cation resin, the loaded cation resin is eluted with an eluent, preferably at a concentration of 0.5-2.5 mol/L. Preferably, the eluent has a flow rate of 5-10 BV/h, and more preferably, 5-6 BV/h. The eluent is not collected until the effluent from the cation column is detected to have pH>7 and the collected liquid is subject to direct purification by an anion column.

Preferably, the column is subject to activation by washing with alkaline solution, washing with acidic solution, and washing with alkaline solution in sequence after it is packed with an anion resin. Preferably, washing with alkaline solution is continued until the pH of the effluent is 8.0-9.5, preferably 8.5-9.5; preferably, the alkaline solution is selected from the group consisting of aqueous ammonia solution, sodium hydroxide solution, potassium hydroxide solution or sodium carbonate solution; preferably, the concentration of the alkaline solution is 0.5-4 mol/L. Preferably, washing with acidic solution is continued until the pH of the effluent is 3.0-7.0, preferably 3.5-4.5. Preferably, the acidic solution is selected from hydrochloric acid solution (the concentration can be 1.5-2 mol/L), phosphoric acid solution, and sodium phosphate dibasic-citric acid buffer.

Preferably, the anion resin is 717-type strongly alkaline styrene based anion exchange resin, D201-type macroporous strongly alkaline styrene based anion exchange resin or D218-type macroporous strongly alkaline acrylic based anion exchange resin. Preferably, the ratio of the amount of the anion resin used to the weight of the feed of the plant as raw materials is 1:1-32 (more preferably, the ratio of the amount of the anion resin used to the weight of the feed of the plant as raw materials is 1:5-16). Collection begins when liquid flows out of the anion resin (preferably, the effluent with pH greater than 8 is collected). Preferably, collection is stopped when the volume of the collected liquid is 0.1-5 times the weight of the feed of the plant as raw materials.

Preferably, the ratio of ethanol used for treatment with alcohol precipitation to the weight of the feed of the plant as raw materials is 1:20-300 (more preferably, 1: 20-50). In the treatment with alcohol precipitation, stirring is performed at a speed of 40-500 rpm. The treatment with alcohol precipitation is for 12-24 h.

Further, steps of impurity removal from the effluent from the anion resin by centrifugation or by filtration through microfiltration membranes, followed by concentration through reverse osmosis membranes are comprised prior to the treatment with alcohol precipitation. The specific gravity of the concentrated liquid can be 1.1-1.25.

The animal species referred to by "animals" in the invention is not particularly limited, and it can be any animal having an intestine organ, preferably mammals, more preferably, rats, mice and humans, and the most preferably, humans.

Preferably, the medicament further comprises a pharmaceutically acceptable carrier. The carrier is a non-active ingredient with no toxic or harmful effects on human bodies and suitable for administration routes or administration manners. The carrier can be a solid or liquid auxiliary material. A solid auxiliary material includes, for example, microcrystalline cellulose, mannitol, lactose, pregelatinized starch, low-substituted hydroxypropyl cellulose, cross-linked povidone, sodium carboxymethyl starch, aspartame, calcium hydrogen phosphate, sodium lactate, poloxamer, sodium dodecyl sulfate, sodium carboxymethyl cellulose, gelatin, xanthan gum, povidone, starch, magnesium stearate, sodium carboxymethyl starch and powdered talc; and a liquid auxiliary material includes, for example, water, ethanol, syrup and glycerol.

Preferably, the medicament is in a dosage form of oral administration; further preferably, the medicament is a tablet, a capsule, an oral solution, an oral emulsion, a pill, a granule, a syrup, and a powder.

The invention further provides a method for preventing and/or treating ulcerative colitis, comprising the steps of: administering to a recipient animal or human a mulberry extract or a main active ingredient thereof to prevent and/or treat ulcerative colitis.

In the invention, the animal can be a mammal.

The invention has the following advantages:

1. The mulberry extract of the invention, as a component derived from natural plants, has unique advantages of smaller toxic and side effects, milder and more lasting actions, and multi-targets and multi-pathways, as opposed to the serious toxic and side effects of the drugs mainly used in clinic at present, for example, an aminosalicylic acid preparation may cause allergic reaction, jaundice, abdominal pain etc. in patients; glucocorticoids may have more toxic and side effects than the aminosalicylic acid preparation. Therefore, the mulberry extract has tremendous advantages in the treatment of inflammatory bowel disease due to great enhancement in safety profile as medication; and 2. The experimental results show that a particular mulberry extract can inhibit colonic atrophy in UC model mice, inhibit weight loss of UC model mice, and reduce Disease Activity Index, DAI, for UC model mice. Moreover, the colonic histopathology is remarkably improved, the colonic structure is relatively intact, the glands are arranged regularly, and the infiltration of inflammatory cells is mild in mice after being treated with the mulberry extract

BRIEF DESCRIPTION OF THE DRAWINGS

In order to explain the specific embodiments in the invention or the technical solutions in the prior art more clearly, the accompanying figures required for the description of the specific embodiments or the prior art will now be briefly introduced below. It is evident that the accompanying figures in the following description are some of the embodiments in the invention. It is possible for one ordinary skilled in the art to get access to other figures according to these accompanying figures without doing creative work.

DESCRIPTION OF THE EMBODIMENTS

Figure 1:
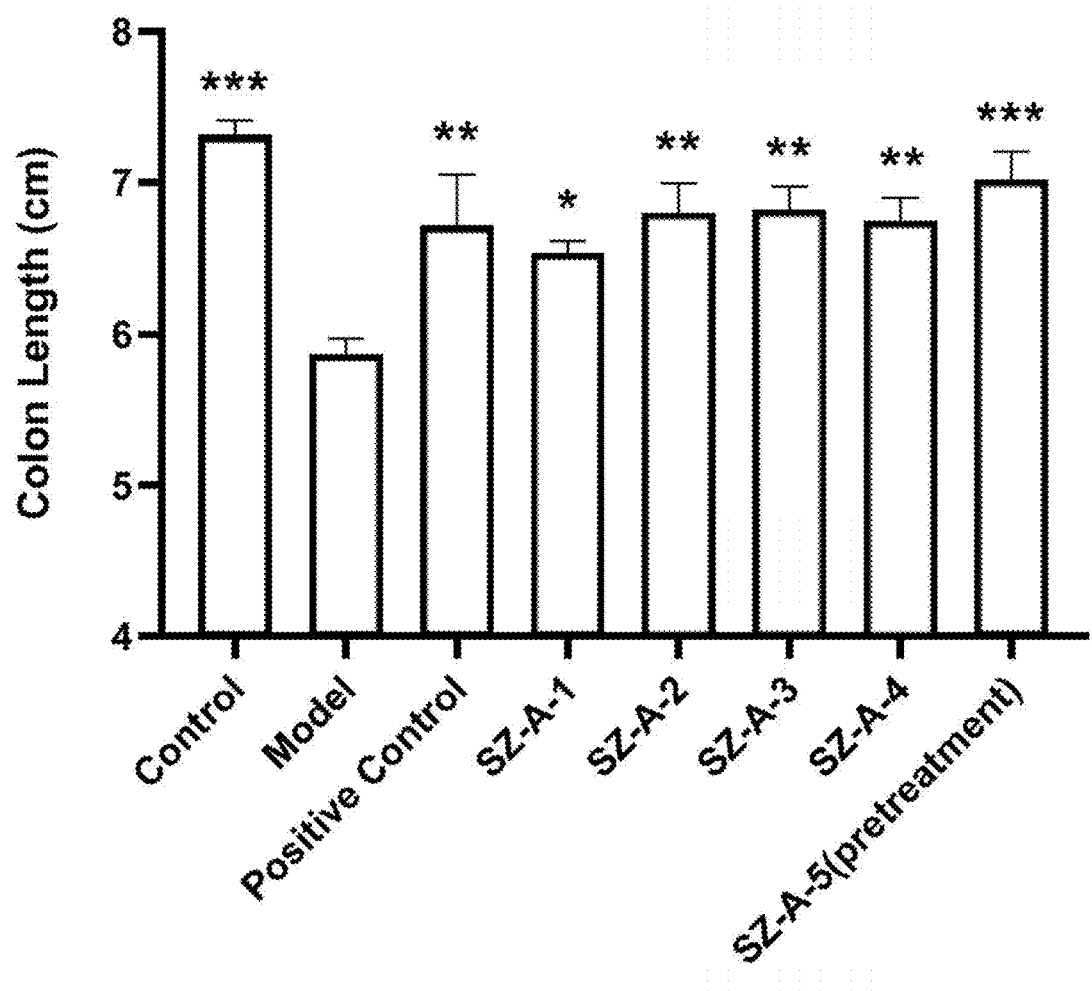
FIG. 1 shows the colon lengths of mice in each treatment group (using the mulberry extract in Preparative Example 1) with * representing $p<0.05$ compared with model group,  $p<0.01$ compared with the model group, and * $P<0.001$ compared with model group.

The invention will now be further explained in detail by way of examples. The features and advantages of the invention will be more explicit by virtue of these exemplary illustrations. The invention, however, is not limited to the following examples. Unless otherwise specified, the methods as described are all conventional ones. Unless otherwise specified, the raw materials as described would be commercially available.

As used herein, the professional language "exemplary" means "serving as an example, embodiment or illustration". Any of the examples described herein as "exemplary" is not necessarily to be construed as being superior or better than other examples.

In addition, the technical features involved in different embodiments of the invention described below can be combined with each other unless they conflict.

The contents of the components involved in the invention have been detected according to the published methods (with reference to the methods described in Patent Publications Nos.: CN111077247A and CN110393738A).

I. Preparative Examples of Mulberry Extract

Preparative Example 1

1000 kg of fresh mulberry twigs (Yuesang No. 11, *Morus serrata* Roxb.) were taken for crushing, followed by addition of 4000 L of water for extraction under heat reflux for 2 h. The extraction liquids were combined and filtered to remove insoluble substances to provide a crude extract. The crude extract was thermally concentrated until the solid content reached 4% by mass, which was kept at 50° C. as a loading liquid onto a cation resin column.

150 kg of D113-type macroporous weakly acidic cation exchange resin was packed in a column, followed by washing with 2 mol/L hydrochloric acid solution until the pH of the effluent was 4.5; washing with 1 mol/L sodium hydroxide solution until the pH of the effluent was 8.5; washing with 2 mol/L hydrochloric acid solution until the pH of the effluent was 4.5; and rinsing with 5 column volumes of deionized water to complete activation. The concentrated extraction liquids were loaded, followed by elution with 1000 L of 2.5 mol/L aqueous ammonia at an elution rate of 6 BV/h. The eluent was collected when the effluent from the cation column was detected to have pH>7. Collection was stopped when the collected liquid reached 900 L. The collected liquid was subject to direct purification by an anion column.

62.5 kg of D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected eluent from the cation resin was loaded onto an anion resin. Collection of the effluent was not stopped until it reached 870 L.

The collected liquid was centrifuged to remove impurities, and then concentrated through reverse osmosis membranes. As a result, the concentrated liquid had a specific gravity of 1.25 and was transferred to a tank for alcohol precipitation, to which 25 L of anhydrous ethanol was added at 500 rpm with a stirring paddle. Once the addition of ethanol was finished, stirring was stopped for alcohol precipitation for 24 h. Supernatant was removed and concentrated under reduced pressure to provide an extractum as a mulberry twig extract.

In the extractum as a mulberry twig extract, the content of alkaloids was 52%, polysaccharides 22%, flavonoids 0.8%, and amino acids 20%. In the alkaloids, the content of 1-DNJ was 60%, FAG 17%, and DAB 15%.

Preparative Example 2

10 kg of fresh mulberry twigs (Sangteyou No. 2) were taken for crushing, followed by addition of 150 L of water in two portions for extraction for 3 h each time according to a decoction method. The extraction liquids were combined and filtered to remove insoluble substances. The extraction liquids were thermally concentrated until the solid content reached 8% by mass, and then transferred to a tank for alcohol precipitation, to which 2367.9 g of anhydrous ethanol (3 L) was added at 300 rpm with a stirring paddle. Once the addition of ethanol was finished, stirring was stopped for alcohol precipitation for 24 h. Supernatant was removed as a loading liquid onto a cation resin column. 5 kg of 002SC-type strongly acidic styrene based cation resin was packed in a column, followed by activation of the cation resin according to the method of Example 1. The extraction liquids that were subject to concentration and alcohol precipitation were loaded, followed by elution with 100 L of 5 mol/L potassium chloride at an elution rate of 5 BV/h. The effluent was detected with 20% silicotungstic acid. Collection began when white precipitate was generated. Collection was stopped when the collected liquid reached 25 L, and the collected liquid was subject to direct purification by an anion column.

10 kg of 711-type strongly alkaline styrene based anion resin was packed in a column, and the anion resin was subject to activation according to the method in Preparative Example 1. The collected eluent from the cation resin was loaded onto an anion resin. Collection of the effluent was not stopped until it reached 15 L. The collected liquid was reloaded onto a cation resin and separated twice with a cation resin and an anion resin in sequence according to the above method.

The collected liquid obtained from column separation for three times was centrifuged to remove impurities, and then concentrated through reverse osmosis membranes. The concentrated liquid had a specific gravity of 1.25 and was transferred to a tank for alcohol precipitation, to which 125 g of anhydrous ethanol was added at 1000 rpm with a stirring paddle. Once the addition of ethanol was finished, stirring was stopped for alcohol precipitation for 24 h. Supernatant was removed and concentrated under reduced pressure to provide an extractum as a mulberry twig extract. Fresh mulberry root-barks and mulberry leaves (Sangteyou No. 2) were taken for additional extraction, the extraction method and parameters were same as above.

In the resulting extractum as a mulberry twig extract, the content of alkaloids was 98%, polysaccharides 0.2%, flavonoids 0.05%, and amino acids 0%. In the alkaloids, the content of 1-DNJ was 99%, FAG 0.5%, and DAB 0.4%.

In the resulting mulberry root-bark extract, the content of alkaloids was 95%, polysaccharides 2%, flavonoids 0.1%, and amino acids 1%. In the alkaloids, the content of 1-DNJ was 96%, FAG 1.5%, and DAB 1.4%.

In the resulting mulberry leaf extract, the content of alkaloids was 90%, polysaccharides 4%, flavonoids 0.1%, and amino acids 3%. In the alkaloids, the content of 1-DNJ was 91%, FAG 3.1%, and DAB 2.8%.

Preparative Example 3

1000 kg of fresh mulberry twigs (*Morus atropurpurea* Roxb.) were taken for crushing, followed by addition of 11500 L of water for extraction under heat reflux for 2 h. The extraction liquids were combined and filtered to remove insoluble substances to provide a crude extract. The crude extract was first subject to centrifugation for impurity removal, and then to concentration through reverse osmosis membranes until the solid content reached 1% by mass as a loading liquid onto a cation resin column.

300 kg of D001-type macroporous strongly acidic styrene based cation resin was packed in a column, and the cation resin was subjected to activation according to the method in Preparation Example 1. The concentrated crude extract was loaded, followed by elution with 5000 L of 0.04 mol/L ammonium nitrate at an elution rate of 5 BV/h. The effluent was detected with 20% silicotungstic acid. Collection began when white precipitate was generated. Collection was stopped when the collected liquid reached 1000 L.

The collected liquid obtained from cation column separation was concentrated through nanofiltration membranes, and concentrated under reduced pressure to provide an extractum of the extract.

In the resulting mulberry twig extract, the content of alkaloids was 15%, polysaccharides 20%, flavonoids 7%, and amino acids 45%. In the alkaloids, the content of 1-DNJ was 55%, FAG 23%, and DAB 10%.

Preparative Example 4

333 kg of dry mulberry twigs (Yuesang No. 11) were taken for crushing, followed by addition of 4000 L of water for extraction in two portions under heat reflux, with each reflux for 1 h. The extraction liquids were combined, filtered, and concentrated to 1 kg of crude drug/L.

150 kg of D113-type macroporous weakly acidic cation exchange resin was packed in a column, followed by washing with 2 mol/L hydrochloric acid solution until the pH of the effluent was 4.5; washing with 1 mol/L sodium hydroxide solution until the pH of the effluent was 8.5; washing with 2 mol/L hydrochloric acid solution until the pH of the effluent was 4.5; and rinsing with 5 column volumes of deionized water to complete activation. The concentrated extraction liquids were loaded, followed by elution with 1000 L of 2.5 mol/L aqueous ammonia at an elution rate of 6 BV/h. The eluent was collected when the effluent from the cation column was detected to have pH>7. Collection was stopped when the collected liquid reached 900 L. The collected liquid was subject to direct purification by an anion column.

125 kg of D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected eluent from the cation resin was loaded onto an anion resin. Collection of the effluent having a pH>8 was not stopped until it reached 870 L. The collected liquid obtained from anion column separation was subject to filtration through microfiltration membranes to remove impurities, and then concentrated through reverse osmosis membranes. The concentrated liquid had a specific gravity of 1.1 and was transferred to a tank for alcohol precipitation, to which 15 kg of anhydrous ethanol was added at 400 rpm with a stirring paddle. Once the addition of ethanol was finished, stirring was stopped for alcohol precipitation for 24 h. Supernatant was removed and concentrated under reduced pressure to provide an extractum as a mulberry twig extract. Contents in the sample are alkaloids 80%, polysaccharides 5%, flavonoids 0.1%, and amino acids 4%. In the alkaloids, the content of 1-DNJ was 75%, FAG 12%, and DAB 10%.

Preparative Example 5

400 kg of dry mulberry twigs (Yuesang No. 11) were taken for crushing, followed by addition of 4000 L of water for extraction in two portions under heat reflux, with each reflux for 1 h. The extraction liquids were combined, filtered, and concentrated to 1 kg of crude drug/L.

62.5 kg of D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected, extracted concentrate was loaded onto an anion resin, and the effluent was collected.

The collected liquid obtained from anion column separation was subject to filtration through microfiltration membranes to remove impurities, and then concentrated through reverse osmosis membranes, and further concentrated under reduced pressure and dried to provide an extractum as a mulberry twig extract. Contents in the sample are alkaloids 3%, polysaccharides 70%, flavonoids 10%, and amino acids 10%. In the alkaloids, the content of 1-DNJ was 68%, FAG 17%, and DAB 8%.

Preparative Example 6

1500 kg of fresh mulberry twigs (Yuesang No. 11, *Morus serrata* Roxb.) were taken for crushing, followed by addition of 6000 L of water for extraction under heat reflux for 2 h. The extraction liquids were combined and filtered to remove insoluble substances to provide a crude extract. The crude extract was thermally concentrated until the solid content reached 4% by mass, which was kept at 50° C. as a loading liquid onto a cation resin column.

100 kg of D113-type macroporous weakly acidic cation exchange resin was packed in a column, followed by washing with 2 mol/L hydrochloric acid solution until the pH of the effluent was 4.5; washing with 1 mol/L sodium hydroxide solution until the pH of the effluent was 8.5; washing with 2 mol/L hydrochloric acid solution until the pH of the effluent was 4.5; and rinsing with 5 column volumes of deionized water to complete activation. The concentrated extraction liquids were loaded, followed by elution with 1000 L of 2.5 mol/L aqueous ammonia at an elution rate of 6 BV/h. The eluent was collected when the effluent from the cation column was detected to have pH>7. Collection was stopped when the collected liquid reached 900 L. The collected liquid was subject to direct purification by an anion column.

62.5 kg of D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected eluent from the cation resin was loaded onto an anion resin. Collection of the effluent was not stopped until it reached 870 L. The effluent was concentrated under reduced pressure to provide an extractum as a mulberry twig extract, in which the content of alkaloids was 30%, polysaccharides 35%, flavonoids 2%, and amino acids 25%. In the alkaloids, the content of 1-DNJ was 62%, FAG 20%, and DAB 13%.

Preparative Example 7

1000 kg of fresh mulberry twigs (Yuesang No. 11, *Morus serrata* Roxb.) were taken for crushing, followed by addition of 4000 L of water for extraction under heat reflux for 2 h. The extraction liquids were combined and filtered to remove insoluble substances to provide a crude extract. The crude extract was thermally concentrated until the solid content reached 4% by mass, which was kept at 50° C. as a loading liquid onto a cation resin column.

100 kg of D113-type macroporous weakly acidic cation exchange resin was packed in a column, followed by washing with 2 mol/L hydrochloric acid solution until the pH of the effluent was 4.5; washing with 1 mol/L sodium hydroxide solution until the pH of the effluent was 8.5; washing with 2 mol/L hydrochloric acid solution until the pH of the effluent was 4.5; and rinsing with 5 column volumes of deionized water to complete activation. The concentrated extraction liquids were loaded, followed by elution with 1000 L of 2.5 mol/L aqueous ammonia at an elution rate of 6 BV/h. The eluent was collected when the effluent from the cation column was detected to have pH>7. Collection was stopped when the collected liquid reached 900 L. The collected liquid was subject to direct purification by an anion column.

62.5 kg of D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected eluent from the cation resin was loaded onto an anion resin. Collection of the effluent was not stopped until it reached 870 L. The effluent was concentrated under reduced pressure to provide an extractum as a mulberry twig extract, in which the content of alkaloids was 40%, polysaccharides 25%, flavonoids 0.5%, and amino acids 25%. In the alkaloids, the content of 1-DNJ was 57%, FAG 24%, and DAB 16%.

Preparative Example 8

333 kg of dry mulberry twigs (Yuesang No. 11) were taken for crushing, followed by addition of 4000 L of water for extraction in two portions under heat reflux, with each reflux for 1 h. The extraction liquids were combined, filtered, and concentrated to 1 kg of crude drug/L.

150 kg of D113-type macroporous weakly acidic cation exchange resin was packed in a column, followed by washing with 2 mol/L hydrochloric acid solution until the pH of the effluent was 4.5; washing with 1 mol/L sodium hydroxide solution until the pH of the effluent was 8.5; washing with 2 mol/L hydrochloric acid solution until the pH of the effluent was 4.5; and rinsing with 5 column volumes of deionized water to complete activation. The concentrated extraction liquids were loaded, followed by elution with 1000 L of 2.5 mol/L aqueous ammonia at an elution rate of 6 BV/h. The eluent was collected when the effluent from the cation column was detected to have pH>7. Collection was stopped when the collected liquid reached 900 L. The collected liquid was subject to direct purification by an anion column.

62.5 kg D218-type macroporous strongly alkaline acrylic based anion resin was packed in a column, followed by washing with 1.5 mol/L sodium hydroxide solution until the pH of the effluent was 9.0; washing with 1.5 mol/L hydrochloric acid solution until the pH of the effluent was 3.5; washing with 1.5 mol/L sodium hydroxide solution until the pH of the effluent was 9.0, to complete activation. The collected eluent from the cation resin was loaded onto an anion resin. Collection of the effluent having a pH>8 was not stopped until it reached 870 L.

The collected liquid obtained from anion column separation was subject to filtration through microfiltration membranes to remove impurities, and then concentrated through reverse osmosis membranes. The concentrated liquid had a specific gravity of 1.1 and was transferred to a tank for alcohol precipitation, to which 15 kg of anhydrous ethanol was added at 400 rpm with a stirring paddle. Once the addition of ethanol was finished, stirring was stopped for alcohol precipitation for 24 h. Supernatant was removed and concentrated under reduced pressure to provide an extractum as a mulberry twig extract. Contents in the sample are alkaloids 63%, polysaccharides 23%, flavonoids 1%, and amino acids 5%. In the alkaloids, the content of 1-DNJ was 61.9%, FAG 16.6%, and DAB 11.1%.

II. Verification of Effects of Mulberry Extract

Experimental Example 9: Pharmacodynamic Assays of Mulberry Extract in Preventing and/or Treating Inflammatory Bowel Disease 1. Experimental Protocols
1.1 Experimental Animals Mice aged 6-8 weeks were adaptively kept in an animal house for 3 days. After weighing, they were randomly divided into 8 groups (counted as Day 0), with 5-6 mice in each group.

Experimental grouping was as follows: group 1, normal control; group 2, model; group 3, positive control; and groups 4-8, SZ-A with different administration doses, respectively. See Table 1 for Details.

1.2 Experimental Drugs

3% DSS was formulated as follows: 3 g of DSS (Dextran Sulfate Sodium Salt) was dissolved in 100 mL of sterile water;

The mulberry twig extract as prepared in Preparative Example 1 was formulated at different concentrations and dissolved in 1% CMC solution;

Drug as positive control: Sulfasalazine Enteric-Coated Tablets (NMPN H31020557).

The main ingredient in this product was sulfasalazine, having 5-[p-(2-pyridylsulfamoyl)phenylazo]salicylic acid as its chemical name.

1.3 Modelling and Dosing

On the day when grouping was done, the mice in group 8, SZ-A-5 (pretreatment) group, were administered with a mulberry twig extract by oral gavage (see the following table for dosages) once a day. All groups are normally available to food and water.

After 3 days from administration to the mice in group 8, each of the groups began to have free access to 3% DSS (Dextran Sulfate Sodium Salt) for modelling and gavage administration except for the normal control group, with the dosage for the positive control group of 5-[p-(2-pyridylsulfamoyl)phenylazo]salicylic acid, 500 mg/kg/d. After 5 days from the start of modelling, the access to 3% DSS was stopped, and all groups had normal drinking water instead, with the administration done normally. The mice were administered continuously and observed for 10 days, and euthanized by cervical dislocation. The colons of the mice were removed by dissection, and the lengths of the colons were measured and photographed. During the administration, the weights of the mice in each group were measured. During the modelling and administration, stool texture and blood in stool of the mice were monitored daily, and Disease Activity Index, DAI, for the mice was scored according to Table 2 below. The results were shown in FIG. 1 to FIG. 3 and FIG. 4.

TABLE 1

Experimental Groupings and Dosages

| Experimental Grouping Nos. | Groups (abbr.) | Dosages |
|---|---|---|
| 1 | Control | Nomal Control |
| 2 | DSS | 3% DSS |
| 3 | SASP | Positive Drug Group |
| 4 | SZ-A-1 | 50 mg/kg/d on extract basis |
| 5 | SZ-A-2 | 100 mg/kg/d on extract basis |
| 6 | SZ-A-3 | 200 mg/kg/d on extract basis |
| 7 | SZ-A-4 | 400 mg/kg/d on extract basis |
| 8 | SZ-A-5 (pretreatment) | pre-administration for 3 days, 200 mg/kg/d on extract basis |

TABLE 2

Criteria for Scoring of Disease Activity Index, DAI, for Mice

| Scores | Weight Loss (%) | Stool Texture | Blood in Stool |
|---|---|---|---|
| 0 | None | Normal | Negative for Fecal Occult Blood Test |
| 1 | 1-5 | / | / |
| 2 | 6-10 | Mushy | Positive for Fecal Occult Blood Test |
| 3 | 11-15 | / | / |
| 4 | 16-20 | Liquid | Blood in Stool Observed with Naked Eyes |

Note: DAI=Score for Weight Loss+Score for Stool Texture+Score for Fecal Occult Blood; Normal Stool: Shaped Stool; Mushy Stool: Pasty, Semi-Shaped Stool without Adhering to Anus; Liquid Stool: Thin, Watery Stool that may Adhere to Anus.

Colonic tissues were removed for H&E staining, which specifically comprises the steps of:

1. Tissue samples, 3 mm thick, were taken for dehydration with alcohol in a series of gradients, 70%, 80%, 95%, 100%, for 30 minutes each, followed by two bottles of xylene for 20 minutes each, impregnation with paraffin wax in two barrels for 12 minutes each, embedding, slicing for 4 microns, and baking.

2. Hematoxylin eosin (HE) staining: (1) Dewaxing with three bottles of xylene for 8 minutes each; two bottles of 100% alcohol for 8 minutes each; 90% alcohol, 80% alcohol and 60% alcohol for 8 minutes each. (2) Staining with hematoxylin for 4 minutes, and washing with running water. (3) Differentiation with hydrochloric acid and alcohol for 2-3 seconds, and washing with running water. (4) 0.5% aqueous ammonia for 20 seconds, washing with running water, and observation on a microscope. (5) Staining with 0.5% eosin for 1 minute. (6) Differentiation with 80% alcohol and 90% alcohol differentiate for 3-5 seconds each; 95% alcohol for 5 minutes; three bottles of 100% alcohol for 5 minutes each; two bottles of xylene for 5 minutes each. (7) Sealing with neutral resin glues; observation and microscopy with an optical microscope. Fresh colonic tissues from each group were placed in 4% paraformaldehyde for fixation, and after 48 hours they were placed in alcohol at different concentrations for gradient dehydration, and then placed in xylene for clearing. The cleared tissues were placed in paraffin wax for embedding. The embedded blocks of paraffin wax were fixed on a slicer for slicing.

1.4 Comparison of Disease Activity Index (DAI) Scores Treating with Mulberry Twig Extracts in Various Preparative Examples.

Figure 5:
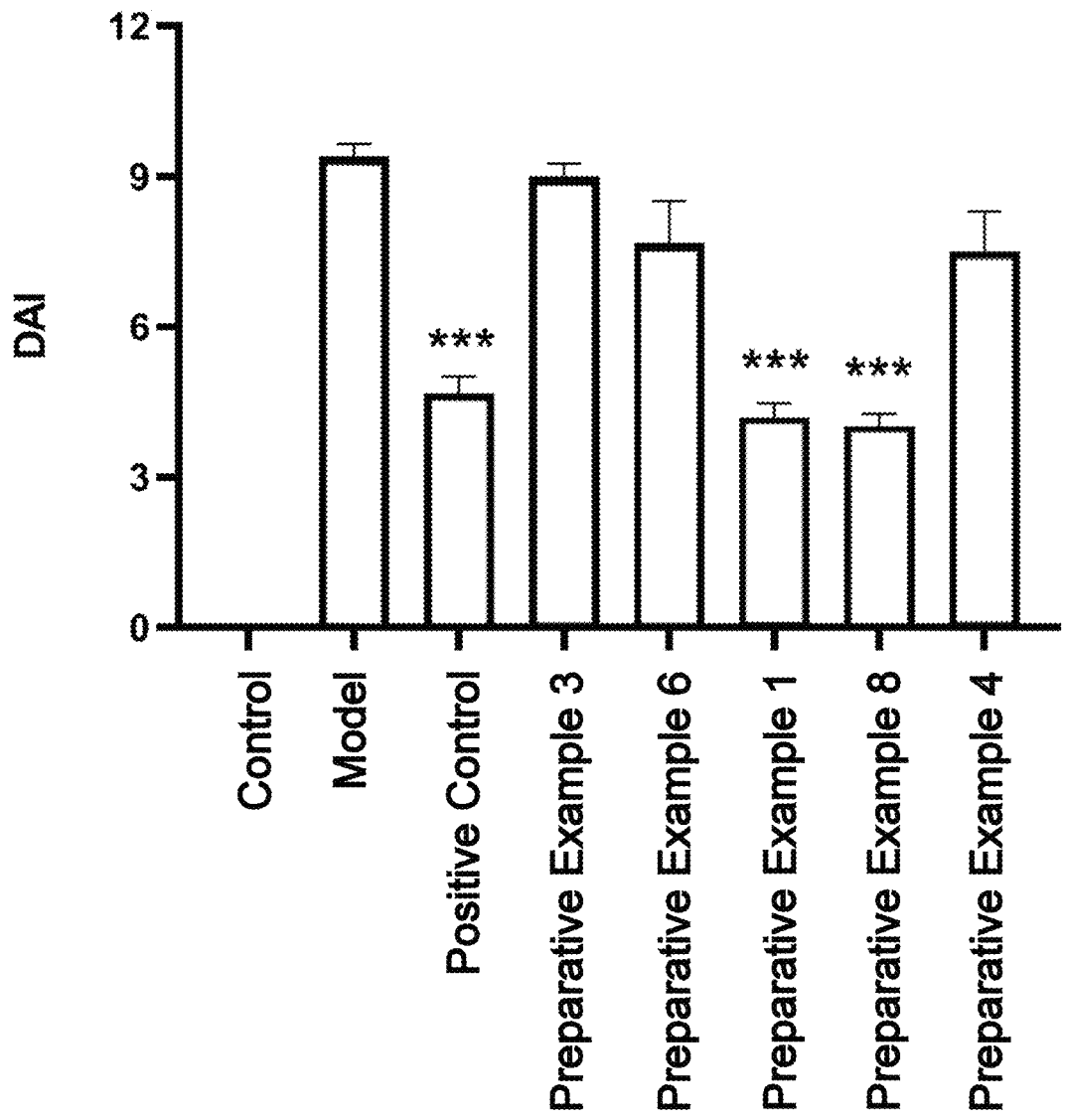
FIG. 5 shows the results of scoring of Disease Activity Index, DAI, for mice treated with the mulberry extract in each Preparative Example with *** representing $p<0.001$ compared with model group.

Disease Activity Index (DAI) scores for mice were compared using the mulberry twig extracts in each preparative example with reference to the experimental steps in sections 1.1-1.3 above. The mulberry twig extracts in Preparative Examples 1, 3, 4, 6 and 8 were used as a drug in a dosage of 200 mg/kg/d based on the mulberry twig extracts. The results are shown in FIG. 5.

1.5 Experimental Results

Figure 2:
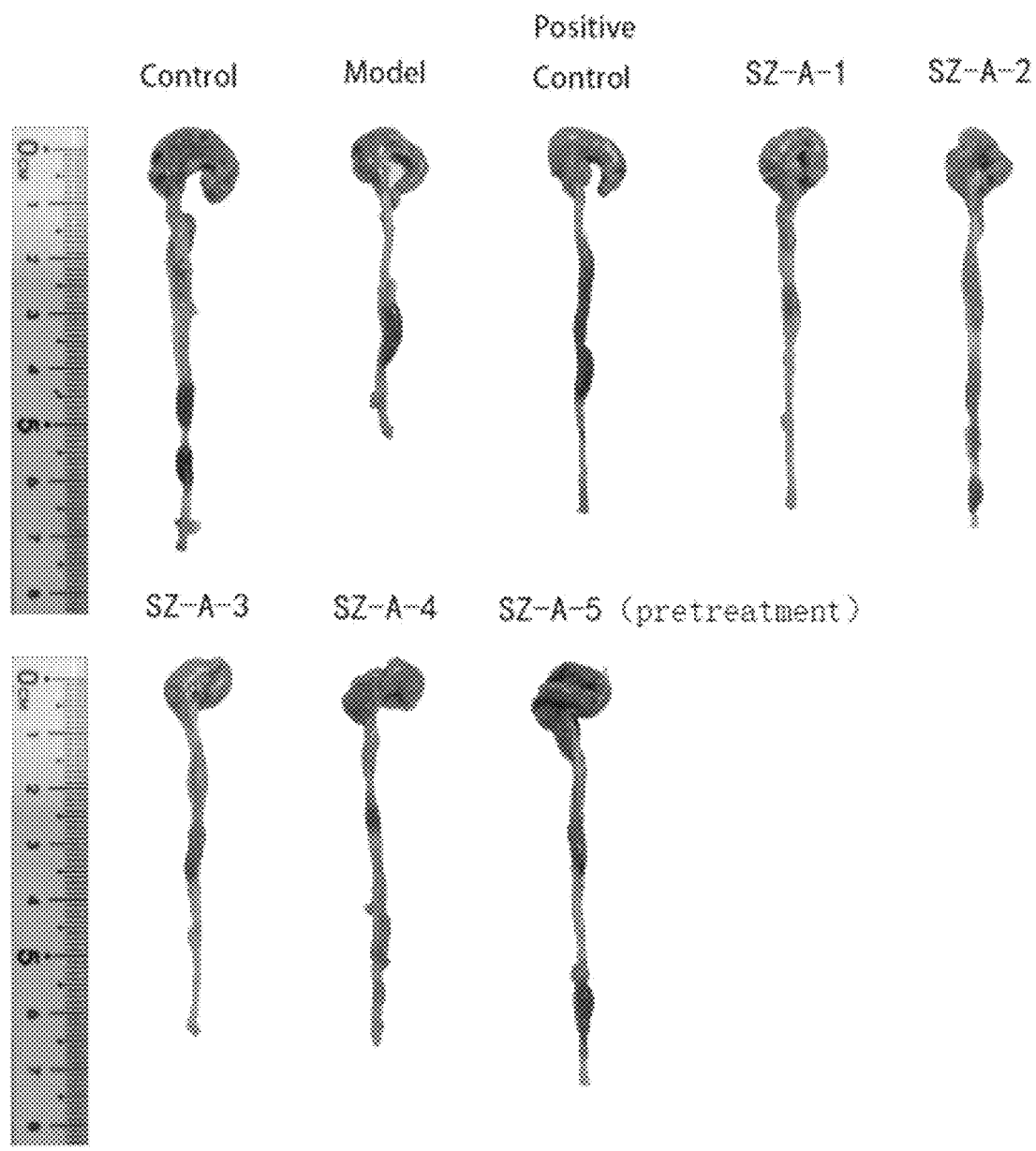
FIG. 2 shows the photographs of the colons of mice in each treatment group (using the mulberry extract in Preparative Example 1)

As shown in FIG. 1 to FIG. 2, the colon length in model group decreased significantly compared with normal control group; positive drug group, SZ-A-1, SZ-A-2, SZ-A-3, SZ-A-4 and SZ-A-5 (pretreatment) all significantly inhibited colonic atrophy in UC model mice compared with model group, and the effects in SZ-A-2, SZ-A-3 and SZ-A-4 groups were comparable to that in positive drug group, with SZ-A-5 (pretreatment) achieving a superior effect to the positive drug in inhibiting colonic atrophy.

Figure 3:
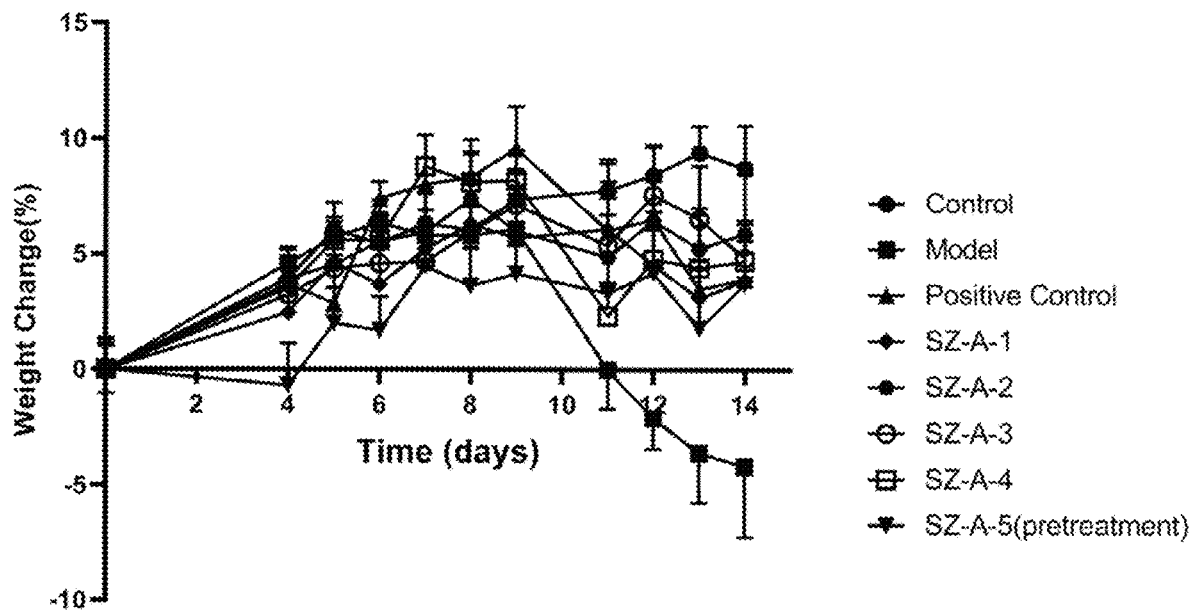
FIG. 3 is a trend diagram of weight change of mice in each treatment group (using the mulberry extract in Preparative Example 1)

As shown in FIG. 3, the weight of mice in model group decreased significantly compared with normal control group; positive drug group, SZ-A-1, SZ-A-2, SZ-A-3, SZ-A-4 and SZ-A-5 (pretreatment) could each inhibit weight loss in UC model mice compared with model group, showing comparable effects.

Figure 4:
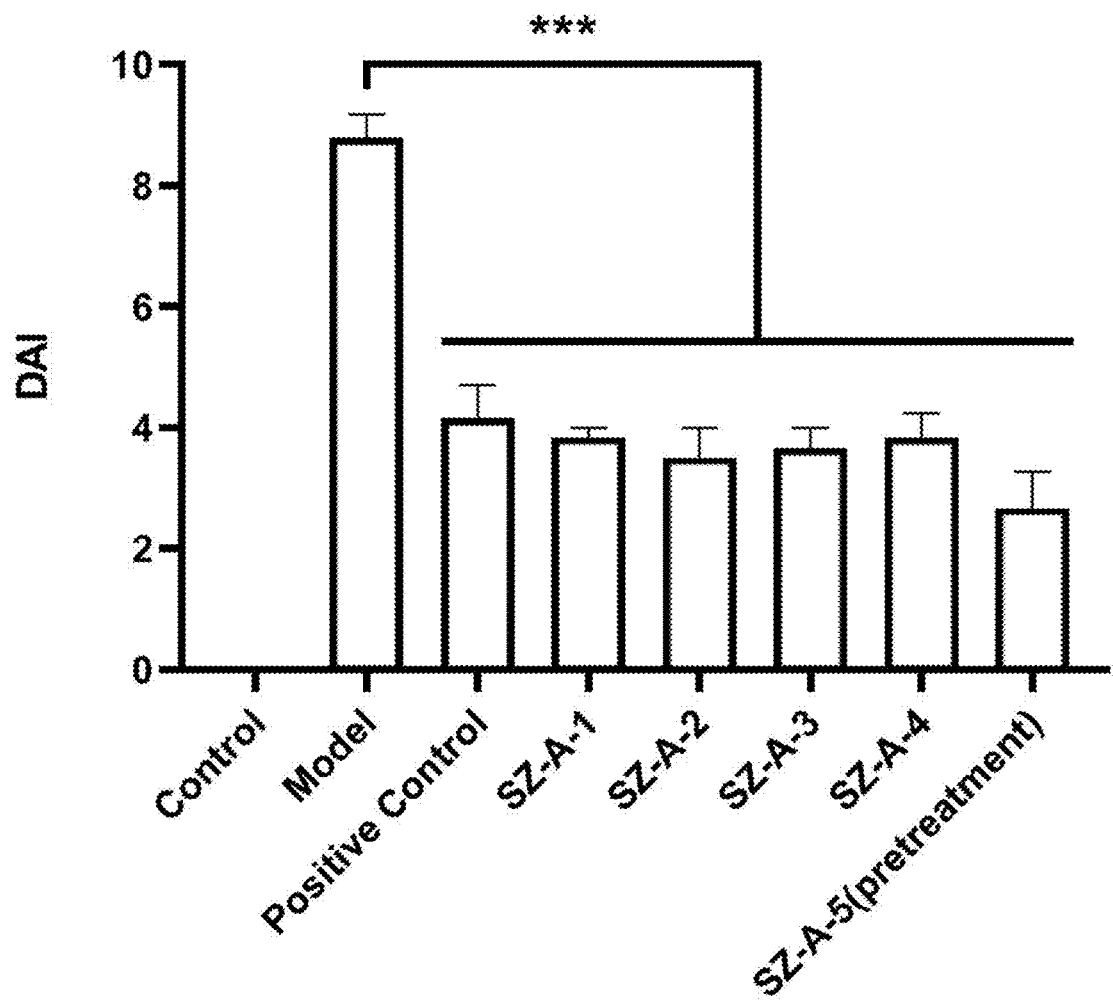
FIG. 4 shows the results of scoring of Disease Activity Index, DAI, for mice in each treatment group (using the mulberry extract in Preparative Example 1) with *** representing $p<0.001$ compared with model group.

As shown in FIG. 4, positive drug group, SZ-A-1, SZ-A-2, SZ-A-3, SZ-A-4 and SZ-A-5 (pretreatment) could each reduce Disease Activity Index, DAI, for UC model mice compared with model group.

As shown in FIG. 5, the specific mulberry extracts provided in Preparative Example 1 (the content of alkaloids was 52%, polysaccharides 22%, flavonoids 0.8%, and amino acids 20%) and in Preparative Example 8 (the content of alkaloids was 63%, polysaccharides 23%, flavonoids 1%, and amino acids 5%) could reduce Disease Activity Index for UC model mice, while the mulberry extracts provided in the other preparative examples showed certain treatment effects.

Figure 6:
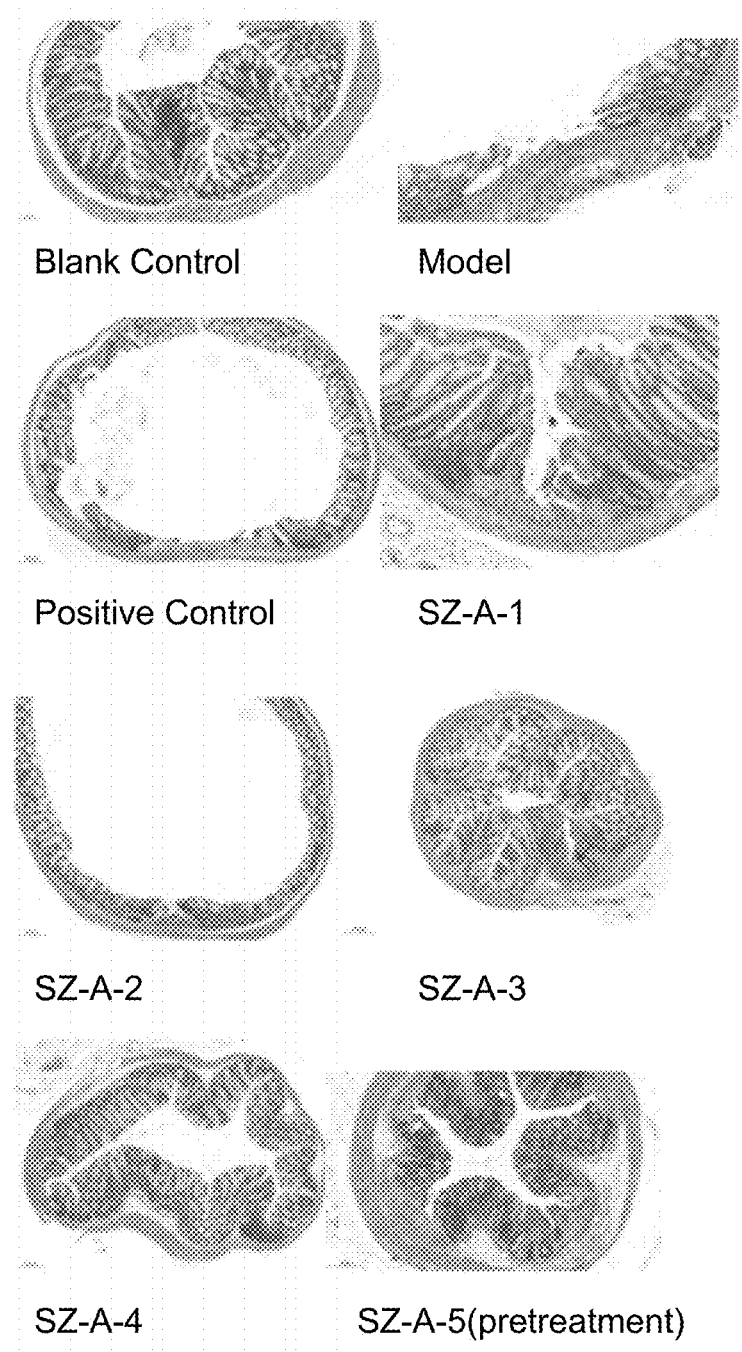
FIG. 6 shows the results of the pathological photographs of mice in each treatment group (using the mulberry extract in Preparative Example 1).

As shown in FIG. 6, tissue sections of UC model mice were observed under an optical microscope, with the colonic structure of control mice shown as intact and clear, and the glands arranged regularly; while in model group, the colonic tissue of mice that had 3% DSS all the time showed congestion and edema in colonic wall, serious inflammatory cell infiltration in mucosa and submucosa, epithelial cell damage and shedding, goblet cell loss, crypt swelling and disruption, and severe colonic ulcer. After treatment with the mulberry extracts, the colonic histopathology of mice was significantly improved, the colonic structure relatively intact, the glands arranged regularly, and the infiltration of inflammatory cells mild, with effects achieved superior to positive control group. It suggested that mulberry extracts could effectively prevent and treat UC, and had a good effect of preventing and treating inflammatory bowel disease.

The invention has been described above in connection with preferred embodiments, but these embodiments are simply exemplary and serve as no more than illustration. In light of this, various alternatives and modifications can be made to the invention, and each of these falls within the scope of protection of the invention.

INDUSTRIAL APPLICATION

The invention experimentally demonstrated that a particular mulberry extract could inhibit colonic atrophy in UC model mice, inhibit weight loss of UC model mice, and reduce Disease Activity Index, DAI, for UC model mice, and that colonic histopathology of mice was significantly improved, the colonic structure was relatively intact, the glands were arranged regularly, and the infiltration of inflammatory cells were mild, after treatment with the mulberry extract. The results above showed that a mulberry extract or a main active ingredient thereof could be used to prepare and treat ulcerative colitis.

What is claimed is:

1. A method for treating ulcerative colitis in a subject, comprising administering a mulberry extract to the subject, wherein the mulberry extract comprises:
   alkaloids 30-98%,
   polysaccharides 0.2-35%,
   flavonoids 0.05-2%,
   amino acids 0-25%,
   based on a weight percentage content of a sum of each component in the mulberry extract,
   wherein the mulberry extract is prepared by a preparation method comprising:
     step 1) preparing a crude extract from a plant of *Moraceae*; crushing mulberry twigs (*Ramulus mori*), mulberry leaves (Folium Mori) or mulberry root-barks (Cortex Mori), for extraction with water and/or acid water, and
     step 2) separating the crude extract with a cation resin or a cation resin and an anion resin, to provide the mulberry extract.

2. The method for treating ulcerative colitis in the subject according to claim 1, wherein administering the mulberry extract results in at least one of:
   (1) inhibition of colonic atrophy in the subject;
   (2) inhibition of weight loss in the subject;
   (3) reduction in Disease Activity Index, DAI, of the subject; and
   (4) improvement in colonic structure, gland arrangement, and inflammatory cell infiltration in the subject.

3. The method for treating ulcerative colitis in the subject according to claim 1, wherein the mulberry extract comprises a mulberry twig extract, a mulberry root-bark extract and/or a mulberry leaf extract.

4. The method for treating ulcerative colitis in the subject according to claim 1, wherein the mulberry extract is in a form of a medicament or a pharmaceutical formulation, and the medicament or the pharmaceutical formulation further comprises a pharmaceutically acceptable carrier.

5. The method for treating ulcerative colitis in the subject according to claim 1, wherein the preparation method of the mulberry extract further comprises:
   step 3) subjecting an effluent from the cation resin or the cation resin and the anion resin in step 2) to an alcohol precipitation and collecting a supernatant; and
   step 4) concentrating and drying the supernatant;

alternatively, the preparation method further comprises: concentrating and drying the effluent from the cation resin or the cation resin and the anion resin in step 2).

6. The method for treating ulcerative colitis in the subject according to claim 1, wherein the mulberry extract comprises at least one of: 1-deoxynojirimycin, N-methly-1-deoxynojirimycin, fagomine, 3-epi-fagomine, 1,4-dideoxy-1,4-imino-D-arabinitol, calystegin B2, calystegin C1, 2-O-($\alpha$-D-galactopyranosyl)-1-deoxynojirimycin, 6-O-($\beta$-D-glucopyranosyl)-1-deoxynojirimycin, and 1,4-dideoxy-1,4-imino-(2-O-$\beta$-D-glucopyranosyl)-D-arabinitol.

7. The method for treating ulcerative colitis in the subject according to claim 1, wherein the subject comprises mammals, including rats, mice or humans.

8. The method for treating ulcerative colitis in the subject according to claim 1, wherein the mulberry extract comprises:
alkaloids 50-65%,
polysaccharides 20-25%,
flavonoids 0.5-1.5%,
amino acids 3-20%,
based on the weight percentage content of the sum of each component in the mulberry extract.

9. The method for treating ulcerative colitis in the subject according to claim 1, wherein administrating the mulberry extract results in reduction in Disease Activity Index, DAI, of the subject.

* * * * *